United States Patent [19]

Wooten et al.

[11] Patent Number: 5,027,451

[45] Date of Patent: Jul. 2, 1991

[54] PORTABLE ANIMAL WASTE DEVICE

[76] Inventors: Richard R. Wooten, 4403 Holmehurst Way West, Mitchellville, Md. 20716; Anton L. Huger, 505 Hope Cir., Waldorf, Md. 20601; Philip N. Middleton, 3818 Beechdown Dr., Chantilly, Va. 22021

[21] Appl. No.: 522,722

[22] Filed: May 11, 1990

[51] Int. Cl.$^5$ .............................................. A01K 29/00
[52] U.S. Cl. ......................................... 4/661; 4/313; 119/162
[58] Field of Search ................ 4/300, 313, 661; 119/1

[56] References Cited

U.S. PATENT DOCUMENTS

| | | |
|---|---|---|
| 2,584,656 | 10/1948 | Anderson . |
| 3,318,285 | 8/1965 | Betham . |
| 3,603,290 | 7/1971 | O'Rork . |
| 3,656,457 | 4/1972 | Houston . |
| 3,747,563 | 7/1973 | Brockhouse ............................ 119/1 |
| 3,811,410 | 5/1974 | Roberts . |
| 3,949,429 | 4/1976 | Hall . |
| 4,011,836 | 3/1977 | Temel .................................... 119/1 |
| 4,117,555 | 10/1978 | Dennis ................................ 119/1 X |
| 4,181,096 | 1/1980 | Grubman . |
| 4,196,693 | 4/1980 | Unversaw . |
| 4,228,554 | 10/1980 | Tumminaro . |
| 4,231,321 | 11/1980 | Cohen ..................................... 119/1 |
| 4,748,700 | 6/1988 | Wooten . |

OTHER PUBLICATIONS

Brochure Entitled "Walk-Me-Not" Handed Out at Invention/New Product Exposition in Pittsburgh, May 3-6, 1990.

Primary Examiner—Charles E. Phillips
Attorney, Agent, or Firm—Walter F. Wessendorf, Jr.

[57] ABSTRACT

A portable animal waste device for use in conjunction with a standard household commode is described. A support structure, mounting a pivoting platform and emplaced over a toilet bowl, is connected to the toilet's flush mechanism. The platform pivots between a lowered position for animal access upon the platform and a raised position following animal exit from the platform. The platform in its raised position forms a washdown enclosure with the support structure. When the platform is in its raised position, the washdown enclosure is washed down and the waste is disposed of by a flushing action. A sensing and electronic control system is provided to activate flushing action only when the animal has exited the platform for a predetermined period of time.

13 Claims, 5 Drawing Sheets

PORTABLE ANIMAL WASTE DEVICE

CROSS REFERENCE TO RELATED PATENT

This application is related to U.S. Pat. No. 4,748,700, also to Wooten, entitled "Portable Animal Waste Device."

BACKGROUND OF THE INVENTION

1. Field of the Invention

It has been recognized that the owning of a household pet carries with it several problems. Either the pet deposits its waste in areas of the home requiring cleanup or it must be regularly walked or let outside. In many areas, the owner is also required to pick up pet waste from outside areas. Often, the owner is unable or unwilling to walk the pet or clean up after the pet. For these reasons, many would-be pet owners are deprived of the benefits of owning a pet.

The present invention relates to a portable animal waste device for use by household pets such as dogs and cats and, more particularly, to a portable animal waste device which is used with a common household commode.

2. Description of the Related Art

There have been various attempts to develop devices for use in the household for the disposal of waste of pets such as dogs and cats. While these devices solve some of the problems involved with animal waste disposal, heretofore, no single device has addressed these problems in as efficient and adequate a manner as the present invention.

U.S. Pat. No. 3,656,457 to Houston describes a receptacle for detachable securement to an existing toilet bowl. A pressure sensitive pad is provided on the top front portion of the housing. The pad is electrically coupled to a solenoid which opens a trap door upon detection of the presence of the animal. When the animal leaves the pad, a solenoid returns to its original position causing an armature to pull downward to operate the flush lever of the toilet. The lever then returns to its normal position while the toilet bowl is being flushed. The animal must properly position itself so that it does not step through the trap door.

U.S. Pat. No. 3,811,410 to Roberts describes a free-standing pet toilet which automatically flushes itself after use by the animal. The device contains a large cut-out over which the animal positions itself. The system is designed so that flushing of the toilet takes place only after a predetermined period of time has passed following exit by the animal, thereby making it unlikely that the animal will reposition itself above the cut-out. The device requires an independent flushing system connected to household plumbing.

U.S. Pat. No. 3,949,429 to Hall describes a device for positioning over a standard household commode. The device fits down into the standard toilet bowl and requires the animal to position itself on the seat or rim of the commode. The toilet bowl must be manually flushed to dispose of the animal waste.

U.S. Pat. No. 4,196,693 to Unversaw describes a self-supported pet toilet which is automatically flushed after use. The device includes a drain at a lowermost point of a bowl, the drain leading to a sewer system. The device, therefore, requires connection to a sewage pipe.

U.S. Pat. No. 4,228,554 to Tumminaro describes a toilet for pets including a platform on which the pet stands while eliminating waste. The device includes a splash shield which is manually lowered prior to manual activation of a flush mechanism for cleansing of the toilet. The device is bolted to a supporting surface and must be physically connected to a plumbing system.

The above discussed devices do not overcome all of the problems associated with an animal waste device. These problems include: (1) the use of excessive space by self-supported waste devices; (2) the odor associated with animal waste; (3) sanitary considerations associated with inaccurately deposited and standing waste; (4) obstruction of living areas caused by standing waste devices; (5) necessity of owner-intervention to dispose of waste; (6) difficulty in training the animal to use the waste device; (7) the cost associated with such a device; and (8) the inability to move such a device after installation.

SUMMARY OF THE INVENTION

It is an object of the invention to provide an animal waste device which can be used in conjunction with a standard household commode to facilitate disposal of the animal waste.

It is another object of the invention to provide an animal waste device which is automatically operated, thereby requiring no intervention bY the animal owner.

It is another object of the invention to provide an animal waste device which quickly disposes of the pet excrement, thereby eliminating the odor and sanitary considerations associated therewith.

It is another object of the invention to provide an animal waste device which the animal can be easily trained to use.

It is another object of the invention to provide an animal waste device which can be easily moved to different locations within the household by the owner.

It is another object of the invention to provide a device which does not require complicated plumbing connections.

It is another object of the invention to provide an animal waste device which takes up little space.

It is a further object of the invention to provide an animal waste device which minimizes manufacturing and eliminates installation costs.

To achieve the foregoing and other objects, and to overcome the shortcomings discussed above, the animal waste device according to the present invention includes a support structure having a pivoting platform with an opening therein for communication with the toilet bowl of a standard commode. The platform is located in the front portion of the support structure. The platform pivots between a normal lowered animal use position which allows access by an animal to such platform; and a raised platform position which closes the support structure and defines a washdown enclosure which is washed down by the flushing mechanism of a standard household commode. The support structure is mounted upon the standard commode and is provided with steps, or some other suitable mounting structure, to enable the animal to climb up to the lowered platform. The animal's entry onto the lowered platform is detected. After the animal completes its excretory function and exits the platform, a predetermined times period is allowed to pass before the platform is pivoted to its raised position. If the animal re-enters upon the lowered platform before such predetermined time period has passed, the platform remains in its lowered animal use position. The same cycle begins again. Only when the animal has exited the platform for the predetermined time period and the platform has been pivoted to its raised position is the flushing mechanism activated.

These and other objects and features of the present invention will become apparent from the following detailed description considered in connection with the accompanying drawings.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENT

Figure 1:
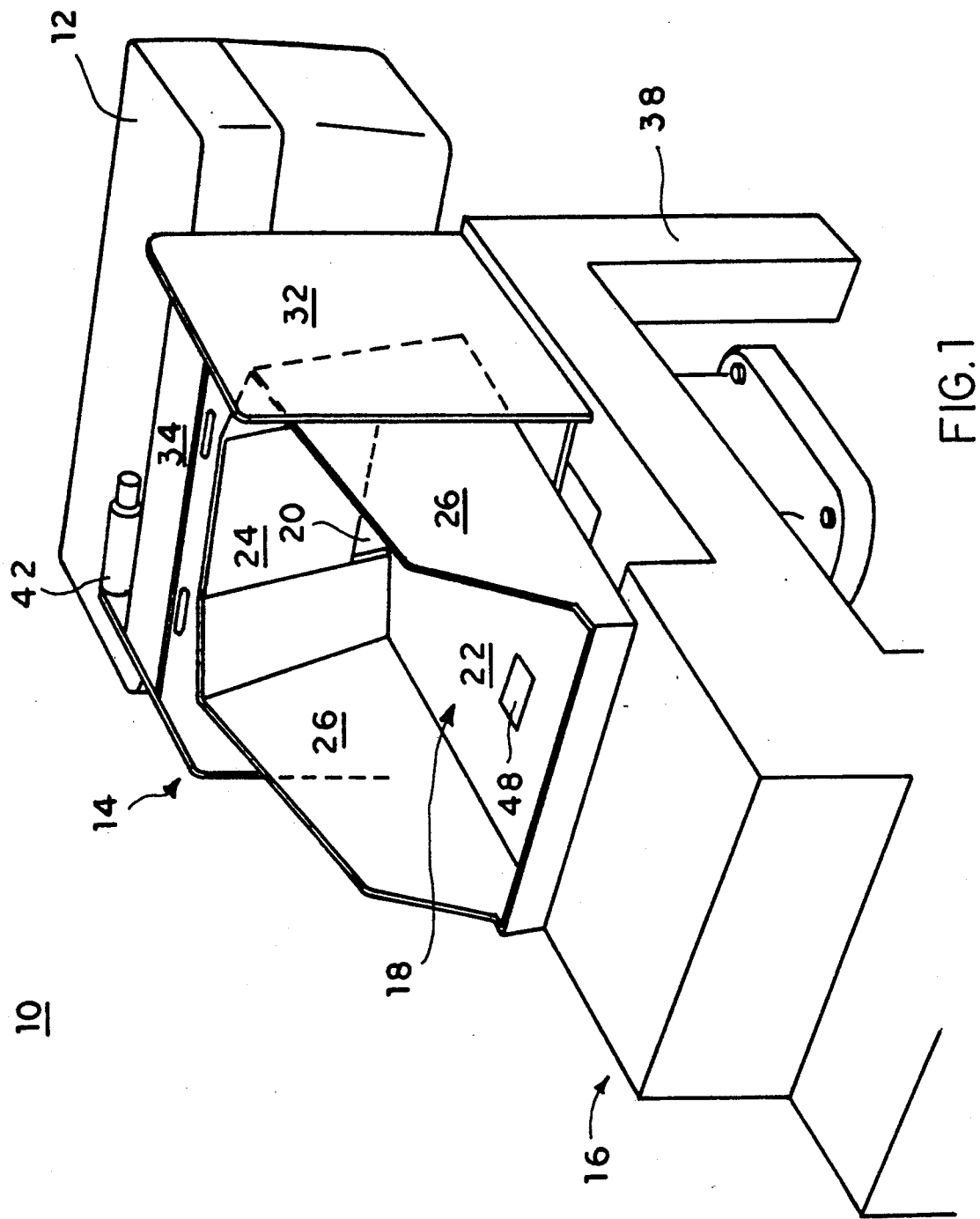
FIG. 1 is a perspective view of the portable animal waste device of the present invention mounted upon a standard human commode.

FIG. 1 of the drawings shows a portable animal waste device 10 used in conjunction with a standard household commode having a cistern 12. The device 10 includes a support structure 14 which is located upon the toilet bowl of the standard commode. Legs 38 support the structure 14 in its operative position. Mounting structure, such as steps 16, provide animal access to the support structure from floor level.

A platform 18 is pivotally mounted with respect to the support structure 14 by means of a hinge 28. The platform 18 pivots between a lowered animal use position whereby the platform is open to allow an animal access thereupon and a raised position whereby the platform 18 is closed. Platform 18 has a surface 22 which in its lowered animal use position, provides a surface upon which the animal steps and excretes its wastes. A surface 24 extends upwardly from surface 22 and has a central opening 20 adjacent to surface 22. Opening 20 allows disposal of wastes deposited on surface 22 to move through opening 20 and into the lower toilet bowl when platform 18 is pivoted to its raised position. Platform 18 further includes side walls 26 which extend between platform surfaces 22 and 24.

Figure 2:
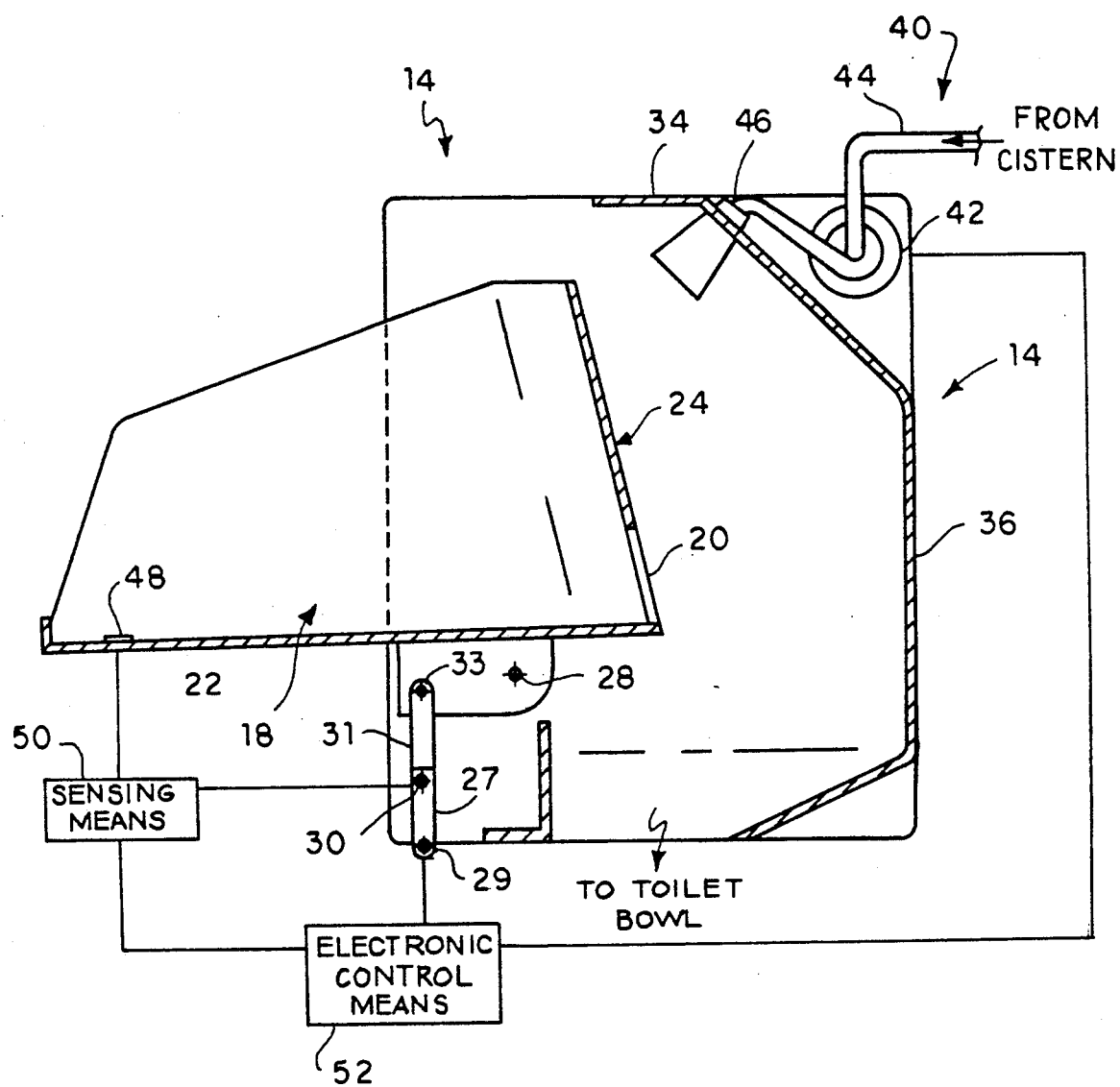
FIG. 2 is a side view of the support structure and platform when the platform is in its lowered animal use positions.

Support structure 14 further includes side walls 32, top wall 34 and rear wall (as shown in FIG. 2) which, together with platform 18 in its raised position, form a washdown enclosure.

Figure 3:
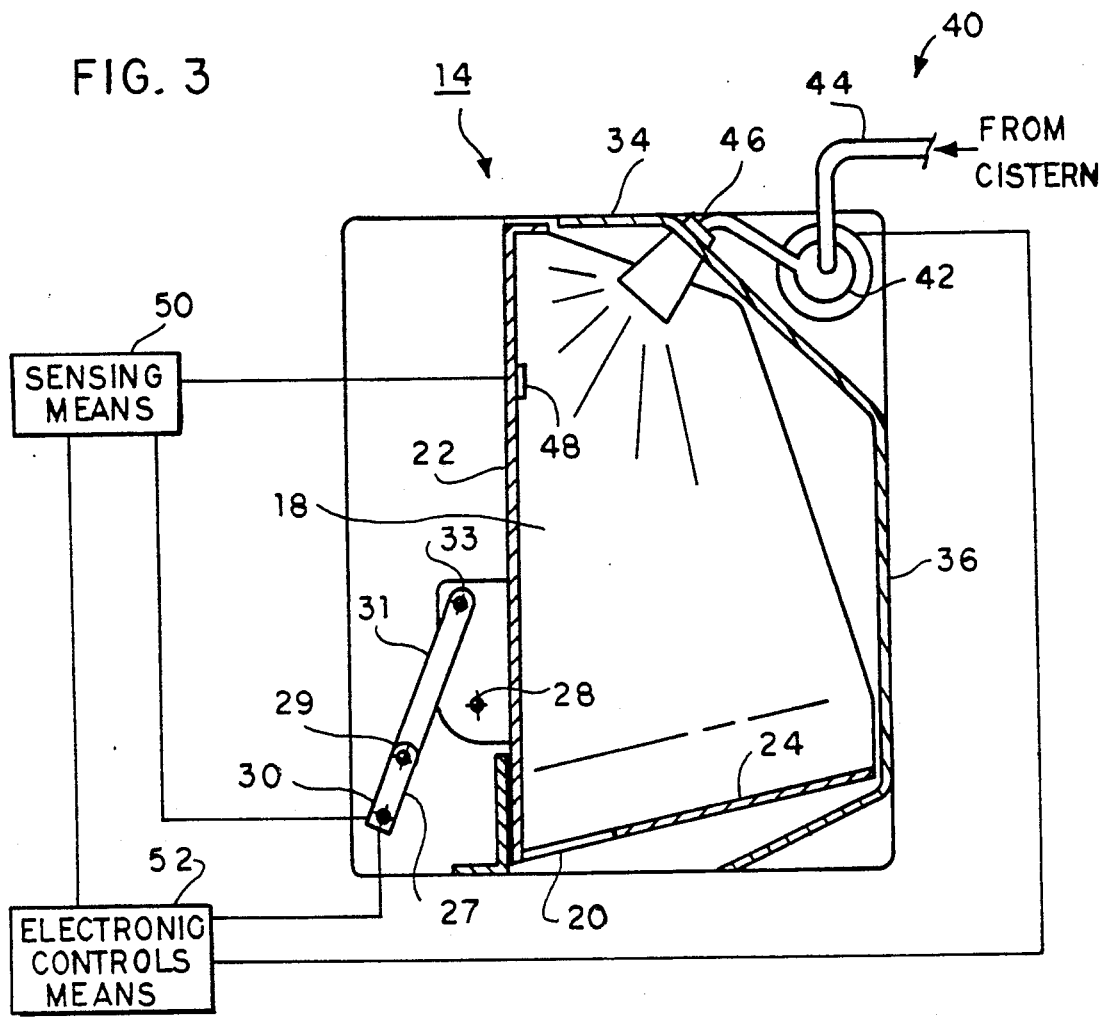
FIG. 3 is a side view of the support structure and platform when the platform is in its raised position.

FIG. 2 illustrates the support structure 14 and the platform 18 in its lowered animal use position for access thereupon by the animal. A motor having a shaft 30 causes pivoting movement of platform 18 between its lowered and raised positions. FIG. 3 further illustrates the support structure 14 and the platform 18, with platform 18 being in its raised position.

Figure 4:
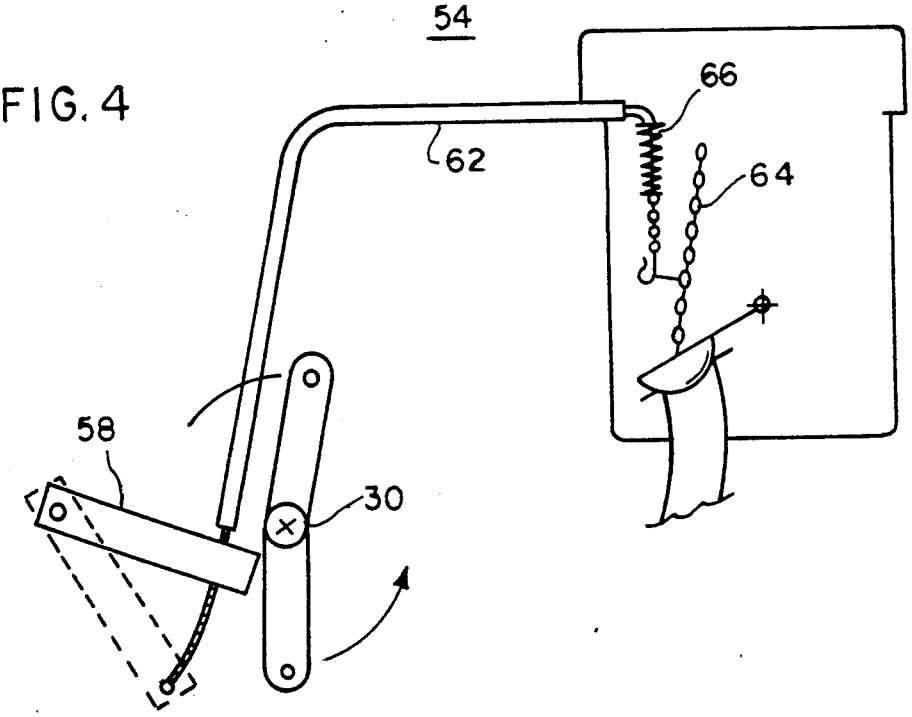
FIG. 4 is a diagram of the actuation of the flushing mechanism.

Cleansing of platform 18 is effected by a water supply system 40, shown in FIG. 3, which is connected to flushing mechanism 54 illustrated in FIG. 4. Water supply system 40 includes a suction hose 40 which extends between the standard cistern 12 which contains water, preferably water having sanitizing and/or deodorizing substances therein, and pump 42 which removes the water from the cistern 12 which contains water, preferably water having sanitizing and/or apparatus which includes at least one spraying head 46. The emission of water from spraying head 46 provides a cleansing action for platform 18 in its raised position and the side walls 32, top wall 34 and rear wall 36 of the support structure 14, forming the washdown enclosure.

Sensing means 50 is provided to detect the entry and exit of the animal upon and from platform surface 22, respectively, and the position to which platform 18 is pivoted by motor shaft 30. Sensing means 50 has a microswitch which remains open until the monitored activity is detected. A magnetic microswitch which is more resistant to water damage could be used instead.

The flushing mechanism 54 used with the standard commode cistern 12 includes a lever 58 which is operated by motor shaft 30. The lever 58, in turn, pulls on cable 62, for example, a Bowden wire cable, which effects standard flushing of the commode by the pulling of chain 64. After flushing, spring 66 returns lever 59 to its inoperative position by way of cable 62.

Support structure 14 is embraced on a standard commode with platfrom 18 in its lowered animal use position. When the animal steps onto platform surface 22, such action is detected by sensor 48, shown in FIG. 1, and thereafter the animal performs its excretory functions. The timer is reset for starting by such detection of he animal's stepping onto platform surface 22 and is started by detection of the animal's exiting from platform surface 22. A time delay circuit, incorporating such timer, is provided in electronic control means 52. If, after a first predetermined time period, of one minute for example, the animal does not step back onto platform surface 22, rotation of motor shaft 30 causes platform 18 to pivot to its raised position. When platform 18 has pivoted to its raised position, sensing means 50 provides a signal to control means 52. Upon receipt of such signal, automatic washdown takes place once platform 18 is in its raised position. Such washdown completely cleanses the interior of the washdown enclosure, including its platform 18. Such automatic washdown takes place for a second predetermined time period. The platform 18 is allowed to drain for a third predetermined time period before platform 18 is returned to its lowered animal use position. The device then shuts off and is ready for reuse.

Figure 5:
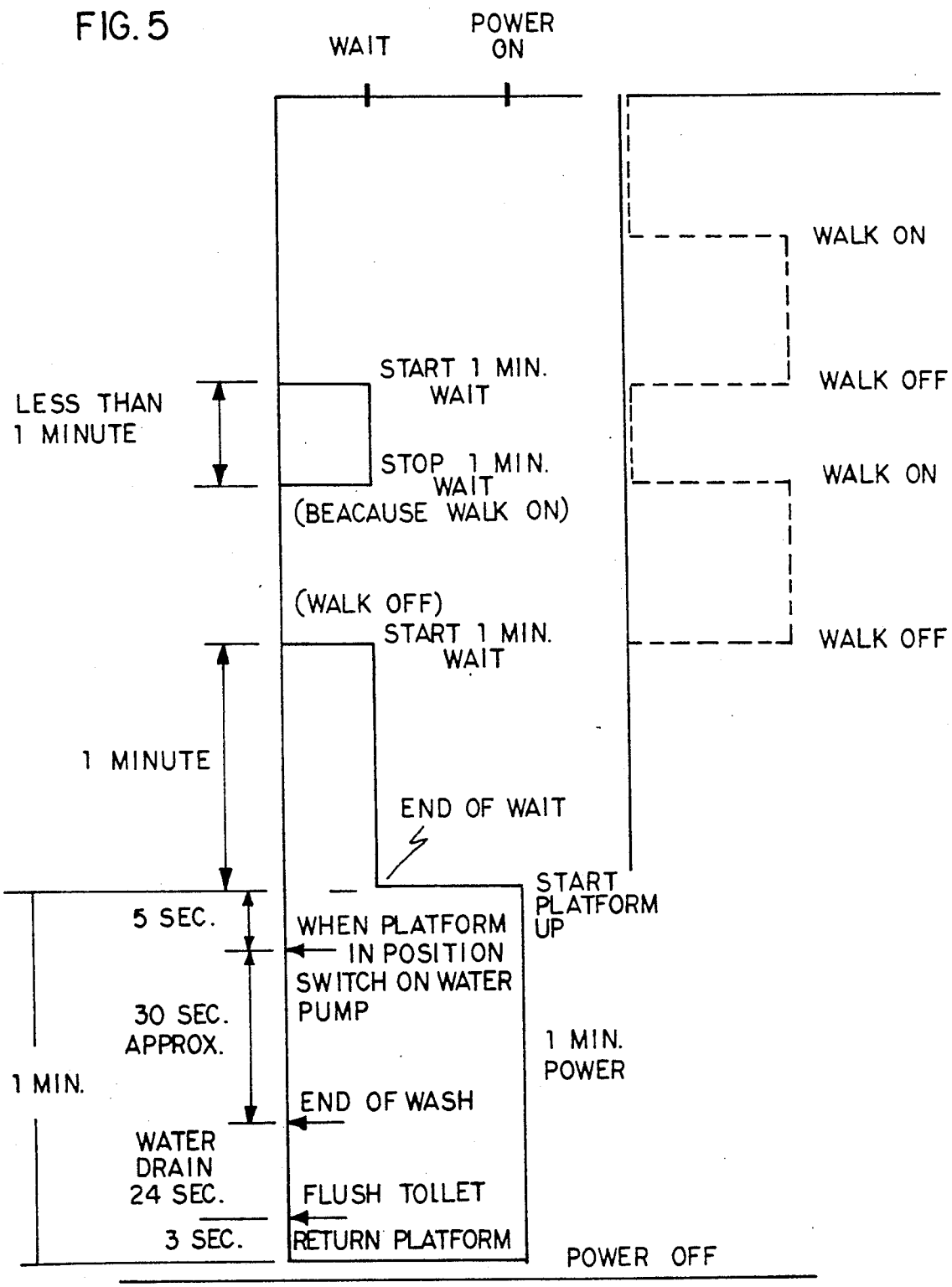
FIG. 5 is a timing diagram for the operation of the device.

If, however, the animal steps back onto surface 22 before the first predetermined time period has expired, the timer is reset and the initiation of the washdown cycle is deactivated. The washdown cycle, therefore, will not begin until the animal has exited surface 22 for at least the first predetermined time period. For illustrative purposes, FIG. 5 shows time periods which can be used for each sequence of operation.

Motor shaft 30 operates to raise and lower platform 18 and to cause lever 58 to pull on cable 62 in response to platform movement, thereby minimizing the cost of the device. Optionally, electronic control means could energize a solenoid or the like to actuate flushing of the commode.

Figure 6:
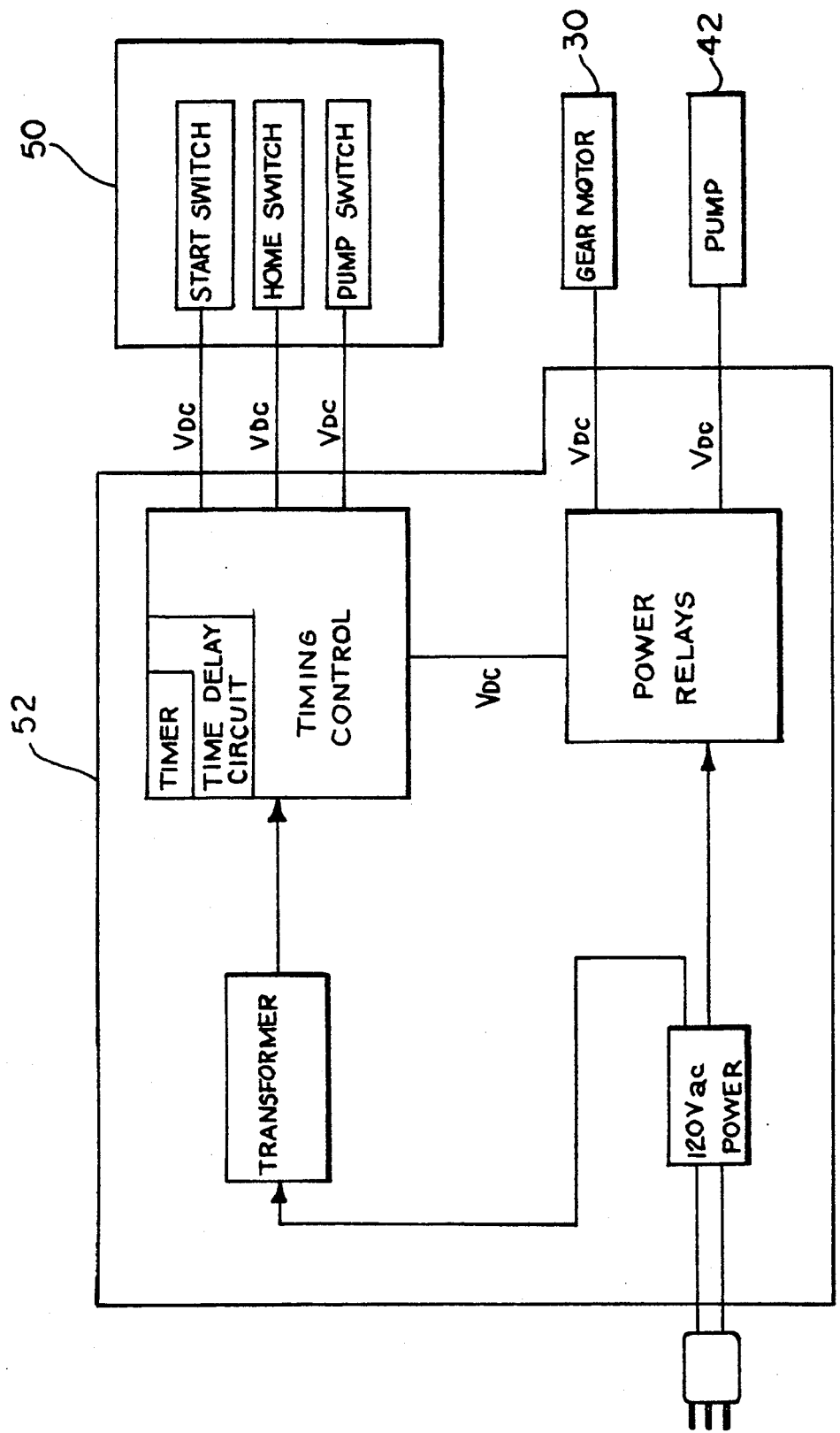
FIG. 6 is a diagram of the sensing and control system used in the device.

Motor shaft 30 is connected to one end of an elongate member 27. The other end of member 27 is pivotally attached to one end of another elongate member 31 by means of pivot 29. The other end of member 31 is pivotally attached to a lower portion of platform 18 at pivot 33. During a complete revolution, motor shaft 30 causes counter-clockwise rotation of member 27. As member 27 rotates, member 31 is moved to lift platform 18 to the position shown in FIG. 3 about midway through one revolution of motor shaft 30. After washdown, the motor shaft 30 completes its revolution during which member 27 moves to operate lever 58 (see FIG. 4). At the end of the motor revolution, the motor element return to the position, as shown in FIG. 2 connected to one end of an elongate member 27. The other end of member 27 is pivotally attached to one end of another elongate member 31 at pivot 29. The other end of member 31 is pivotally attached to a lower portion of platform 18 at pivot 33. During a complete revolution of the motor, shaft 30 causes counterclockwise movement of member 27. As member 27, rotates, member 31 is moved to lift platform 18 to the position shown in FIG. 3 about midway through one revolution of the motor. After washdown, the motor completes the revolution and as this is done, member 27 moves to operate lever 58 (see FIG. 4). At the end of the motor revolution, FIG. 6 illustrates the sensing and control system used in the portable animal waste device. Start switch detects entry and exit of the animal to and from platform 18, respectively. Home switch detects that platform 18 is in its lowered animal use position for resetting of the device. Pump switch detects that platform 18 is in its raised position for operation of pump 42. Power is supplied from a standard wall outlet to operate the motor shaft 30, pump 42, electronic control means 52, and sensing means 50.

It can, therefore, be seen that the animal waste device according to the present invention overcomes the shortcomings present in such devices. By removing water from a standard cistern, no direct connection to the household water system is required which could contravene existing health codes. The device is shaped in such a manner as to be adequately large to accommodate the animal without intimidating the animal, yet small enough to not overwhelm existing living space while preventing a closed-in atmosphere to the animal. The device is further designed such that excretory matter does not contact the standard commode and is completely washed down from the interior of the device.

It will be apparent to those skilled in the art that various mechanisms and circuits may be employed to carry out the functions described herein. For example, various types of sensors can be employed such as weight sensors, optical sensors, or any mechanical, electronic or optical sensor having the capability of detecting presence and/or position. The portable device could be designed to be self-supporting, therefore, the use of an independent flushing system could be readily provided. A different mounting structure such as a ramp leading to the support structure could be provided for animals not willing to climb steps. The spraying mechanism could alternately be positioned elsewhere in the support structure as long as it has the ability to completelY wash the walls and platform thereof. Various types of time-delay mechanisms are available, including clock mechanisms, both electrical and mechanical, to function as a timer.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

We claim:

1. A portable device for use on a standard human commode for the disposal of animal waste material, said device comprising:
   a support structure for removable securement to the standard human commode, said support structure including a pivoting platform, said platform having an opening for communication with the standard human commode;
   a hinge means for pivotally securing said platform to said support structure, said platform pivoting between a normal lowered animal use position in which said support structure is open to allow an animal access to walk thereon and a raised position in which said platform is closed preventing access thereto by an animal;
   a washing means communicating with the standard human commode for cleansing the platform; and
   sensing means on the platform for detecting the entry and exit of the animal to and from the platform, respectively, and for detecting the position of the platform, said sensing means triggering the operation of said washing means in response to both the animal exiting the platform and the platform pivoting to its raised position.

2. The portable device as recited in claim 1, wherein:
   said support structure includes a rear wall, a top wall and two side walls; and
   said pivoting platform includes a first surface which forms a front wall closing said support structure in the raised platform position, said first platform surface defining a support surface for the animal in the lowered platform position.

3. The portable device as recited in claim 2, wherein:
   said pivoting platform includes a second surface extending upwardly from said first platform surface in the lowered platform position, said second platform surface having said opening therein, said opening allowing passage of animal waste from said pivoting platform to the standard commode when said platform is pivoted to its raised position.

4. The portable device as recited in claim 3, wherein:
   said opening is located in a central portion of said second platform surface adjacent to said first platform surface.

5. The portable device as recited in claim 3, wherein:
   said pivoting platform includes two side surfaces extending between said first and second platform surfaces.

6. The portable device as recited in claim 1 and further comprising:
   mounting means connected to said support structure to enable the animal to access the platform.

7. The portable device as recited in claim 6, wherein:
   said mounting means comprise steps.

8. The portable device as recited in claim 1, wherein:
   a motor is connected to said pivoting platform by a rotatable shaft, said motor shaft raising said platform following detection by said sensing means of the exit of the animal, and said motor shaft lowering said platform following cleansing by said washing means for said platform.

9. The portable device as recited in claim 8 and further comprising:
   electronic control means connected to said sensing means, said electronic control means being responsive to the detection of the entry of the animal onto the platform within a predetermined time period following the detection of the exit of the animal from the platform, said control means responding by inhibiting the raising of the platform until entry of the animal is not detected within the predetermined time period and said control means responding by stopping the triggering of the washing means when platform raising is inhibited.

10. The portable device as recited in claim 9, wherein:
said control means resets the device following cleansing by said washing means by controlling said motor to lower said platform.

11. The portable device as recited in claim 1, wherein:
said washing means includes a suction hose having two ends, one end of said suction hose being placed in a water-containing cistern of a standard commode;
said support structure together with said platform, when said platform is in its raised position, forming a washdown enclosure;
said portable device further comprises a spraying means for spraying the washdown enclosure with water form the cistern, said spraying means being connected to an internal portion of said support structure;
said portable device further comprises a pump means connected to the second end of the suction hose and to the spraying means, said pump means removing water from the cistern for supply to the spraying means; and
said portable device further comprises actuation means for automatically effecting operation of said washing means and flushing of a standard commode, said actuation means being triggered by raising of said pivoting platform.

12. The portable device as recited in claim 11, wherein:
said actuation means includes a motor and connecting lever, said motor lowering the platform and causing the lever to pull on a cable for connection to a flush system of a standard commode.

13. The portable device as recited in claim 11, wherein:
said actuation means includes means for pulling a chain in the cistern of the standard commode.

* * * * *